US010665008B2

(12) United States Patent
Trousdale et al.

(10) Patent No.: US 10,665,008 B2
(45) Date of Patent: May 26, 2020

(54) HYBRID TRAVERSAL OF OBJECT SETS

(71) Applicant: Microsoft Technology Licensing, LLC, Redmond, WA (US)

(72) Inventors: Geoffrey Tyler Trousdale, Redmond, WA (US); Anthony Tunjen Hsieh, Kirkland, WA (US); Danielle Renee Neuberger, Redmond, WA (US); Christopher Nathaniel Raubacher, Redmond, WA (US); Harneet Singh Sidhana, Seattle, WA (US); Jeffrey Evan Stall, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 0 days.

(21) Appl. No.: 15/994,747

(22) Filed: May 31, 2018

(65) Prior Publication Data
US 2019/0371046 A1    Dec. 5, 2019

(51) Int. Cl.
*G06T 11/00* (2006.01)
*G06T 15/20* (2011.01)
*G06F 9/451* (2018.01)
*G06T 11/60* (2006.01)

(52) U.S. Cl.
CPC .............. *G06T 15/20* (2013.01); *G06F 9/451* (2018.02); *G06T 11/00* (2013.01); *G06T 11/60* (2013.01)

(58) Field of Classification Search
CPC ....................................................... G06F 9/451
See application file for complete search history.

(56) References Cited

U.S. PATENT DOCUMENTS

| 6,392,644 | B1* | 5/2002 | Miyata | G06T 15/405 |
| | | | | 345/419 |
| 8,130,239 | B1 | 3/2012 | Garrity | |
| 2002/0060678 | A1 | 5/2002 | Sowizral et al. | |
| 2005/0091576 | A1* | 4/2005 | Relyea | G06F 9/451 |
| | | | | 715/211 |
| 2005/0102636 | A1* | 5/2005 | McKeon | G06F 9/451 |
| | | | | 715/854 |

(Continued)

OTHER PUBLICATIONS

"International Search Report and Written Opinion Issued in PCT Application No. PCT/US19/033191", dated Aug. 16, 2019, 11 Pages.

*Primary Examiner* — Ryan McCulley
(74) *Attorney, Agent, or Firm* — Workman Nydegger

(57) ABSTRACT

Object sets are often organized and traversed in a hierarchical manner according to ownership, wherein a subset of contained objects are processed before or after a containing object that contains the contained objects. Such object sets may also be presented as a scene, which may involve traversing the object set in a drawing order, such as a descending distance order that renders objects in a back-to-front manner. It may be difficult to reconcile these distinct traversal techniques, particularly if different portions of the object set utilize a different traversal order. Presented herein are hybrid traversal techniques in which a selected subset of related objects is identified and traversed in a drawing order, and the remainder of the object set is traversed in an ownership order, in furtherance of various tasks that involve hybrid traversal orders and/or to facilitate the traversal of different types of object subsets within the object set.

20 Claims, 10 Drawing Sheets

(56) References Cited

U.S. PATENT DOCUMENTS

| | | | | |
|---|---|---|---|---|
| 2006/0271871 A1* | 11/2006 | Blaukopf | ............... | G06F 17/212 |
| | | | | 715/764 |
| 2008/0278482 A1 | 11/2008 | Farmanbar et al. | | |
| 2013/0145313 A1* | 6/2013 | Roh | ...................... | G06F 3/0481 |
| | | | | 715/802 |
| 2013/0205197 A1* | 8/2013 | O'Neill | .................. | G06Q 10/10 |
| | | | | 715/236 |
| 2015/0019576 A1* | 1/2015 | Seneski | ............... | G06F 17/2705 |
| | | | | 707/755 |
| 2016/0070681 A1* | 3/2016 | Furtwangler | ........... | G06F 9/451 |
| | | | | 715/234 |

* cited by examiner

HYBRID TRAVERSAL OF OBJECT SETS

BACKGROUND

Within the field of computing, many scenarios involve a collection of objects that are organized in a hierarchical manner, such as a first object that encapsulates a collection of objects. In some scenarios, the hierarchical organization may be organized as a tree, in which the root node directly or indirectly encapsulates or owns all of the other objects, and in which the ownership relationship between an owning and an owned object is represented as a connection between a parent node and a child node.

In such scenarios, it is sometimes desirable to perform various forms of processing over the object set. For example, the objects comprise controls of a user interface within an encapsulating object such as a container, and it may be desirable to save the state of the object set by invoking a save( ) function on each of the objects. In order to ensure that each object receives the message and performs processing, the root node of the tree (representing the topmost object in an ownership order) may receive an invocation of the save task, and along with saving its own state, the root node may pass the task on to each of its child nodes. The downward propagation of the task by each node ensures that all objects represented by the nodes of the tree are invoked.

Additionally, in such scenarios, it is sometimes desirable to render the object set as a scene, such as a three-dimensional space of volumetric objects or a two-dimensional rendering of planar objects organized by priority or depth. For example, if the object set represents a collection of controls comprising a user interface such as a window, it may be desirable to invoke a render function on each of the user interface controls to generate a pictorial representation of the user interface. As with processing, the root node of the tree (representing the window) may receive an invocation of the draw task, and along with drawing its own properties, the window may pass the task on to each of its child nodes. The downward propagation of the draw task by each node ensures that all controls comprising the window are drawn into the user interface.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As previously described, an object set of objects may be hierarchically organized, where the hierarchical arrangement may facilitate the propagation of messages in order to perform various tasks, such as processing the individual objects and drawing the objects into a user interface. However, a significant problem may arise where the manner in which the object set is traversed varies for different tasks. While each of several different traversal techniques (e.g., depth-first traversal and breadth-first traversal) may provide a traversal that reaches all nodes of a tree, the order may vary in a manner that is variously suitable for different tasks.

Moreover, for some tasks, the traversal may vary among subsets of nodes of the tree. For example, when drawing a combination of components, it may be desirable to utilize an ownership ordering for some nodes (e.g., rendering each of several contained objects, and then invoking a rendering function on a container that visually aggregates the objects), and to utilize a depth-based approach for other nodes (e.g., drawing the object that is underneath and/or most distant the other objects, and then progressively drawing other objects that are above, in front of, and/or closer than the previously drawn objects). Where different tasks involve different traversal techniques, it may be possible to provide different structural organizations, e.g., two distinct hierarchical trees that organize the object set in different orders that are suitable for different tasks. However, the implementation of duplicate structural organizations consumes more storage space and requires additional processing to manage all structural organizations as well as to maintain synchrony, particularly if the object set is large or diverse.

Presented herein are techniques for representing, accessing, and presenting object sets in a manner that enables different types of traversal for different tasks.

In accordance with the techniques presented herein, a device may comprise a processor and a memory storing a system comprising an object set of objects that are organized by a ownership order reflecting ownership relationships among the objects, and a scene presenter comprising instructions that, when executed by the processor, cause the device to identify a subset of related objects of the object set and a drawing order of the related objects of the subset; perform a hybrid traversal of the object set according to the drawing order for the subset of the related objects and the ownership order for a remainder of the object set; render the objects into the scene according to the hybrid traversal; and present the scene generated by the rendering.

In accordance with the techniques presented herein, a method of presenting a scene of an object set of objects that are organized by a ownership order reflecting ownership relationships among the objects, involving a device having a processor, may comprise executing, by the processor, instructions that cause the device to identify a subset of related objects of the object set and a drawing order of the related objects of the subset; perform a hybrid traversal of the object set according to the drawing order for the subset of the related objects and the ownership order for a remainder of the object set; render the objects into the scene according to the hybrid traversal; and present the scene generated by the rendering.

In accordance with the techniques presented herein, a method of representing an object set of objects that are organized by a ownership order reflecting ownership relationships among the objects, involving a device having a processor, may comprise executing, by the processor, instructions that cause the device to, responsive to a request to display a scene of the objects, identify a subset of related objects of the object set and a drawing order of the related objects of the subset; perform a hybrid traversal of the object set according to the drawing order for the subset of the related objects and the ownership order for a remainder of the object set; and present a rendering of the objects according to the hybrid traversal. Additionally, the execution of the instructions may cause the device to, responsive to a request to process the objects of the object set, perform an ownership traversal of the object set only according to the ownership order, and process the objects of the object set according to the ownership traversal.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent

DETAILED DESCRIPTION

Figure 1:
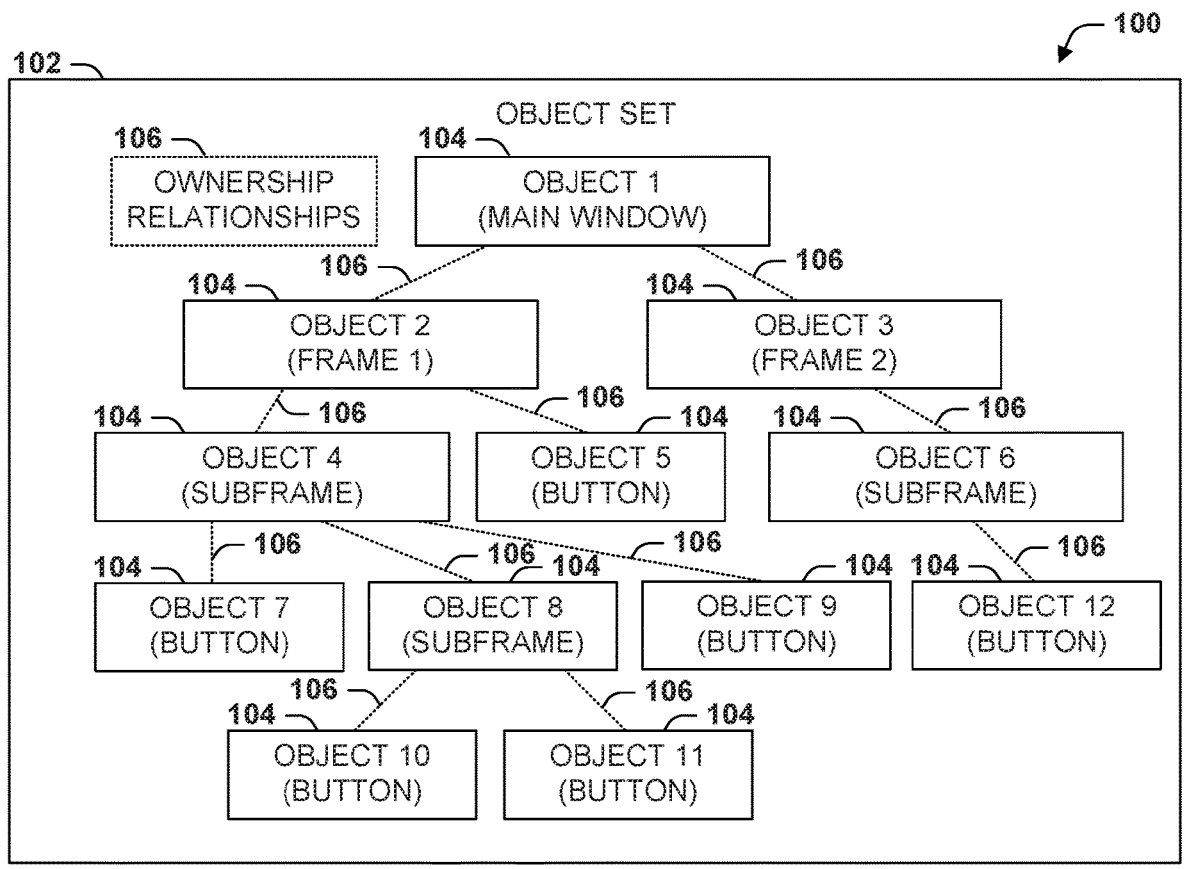
FIG. 1 is an illustration of an example scenario featuring an organization of an object set and an ownership order traversal of the object set according to ownership relationships.
Figure 1:
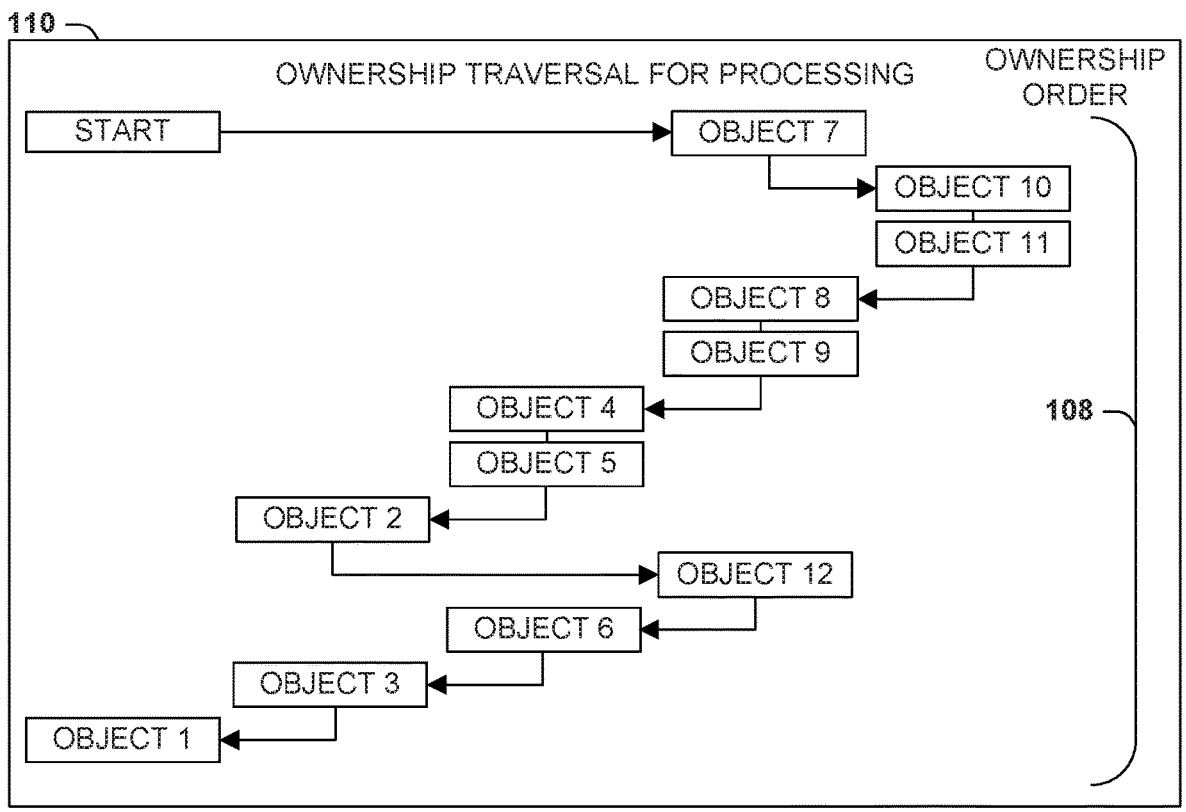

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

A. Introduction

FIG. 1 is an illustration of an example scenario featuring an object set 102 of objects 104 that are arranged according to a set of ownership relationships 106, such as a hierarchical tree. For example, the object set 102 may comprise a three-dimensional scene (represented as the root node of the tree) that owns a collection of volumetric objects within the scene (represented as children of the root node), where each volumetric object comprises a collection of components that may include sub-components, etc. As another example, the objects may comprise a set of content objects arranged in a two-dimensional space, such as a collection of windows that respectively present subsets of user interface controls such as buttons, textboxes, and combo boxes. Some of the user interface controls may comprise subsets of other user interface controls, such as a frame within a window that contains a set of buttons or a child window of a main window. The structure of the object set 102 may reflect the ownership relationships 106 thereamong, such as a tree in which an ownership relationship 106 between a containing or owning object 104 and a contained or owned object 104 is represented as a connection between a parent node and a child node of the tree. When represented as a tree, the object set 102 may comprise one or more root nodes that represent the top-level object(s) 104 and one or more leaf nodes that represent individual objects 104 that do not own any other objects 104, such as atomic items or primitive values.

The objects 104 of the object set 102 may be utilized for a variety of tasks, such as processing, rendering, and saving or loading the state. For example, when the object set 102 is represented as a tree, a task may be delivered to the root node of tree, which may perform the task and also propagate the task downward to the child nodes of the tree. If the object set 102 is structured in the manner of a typical tree (e.g., where each non-root node has one and only one parent node, and where none of the ownership relationships 106 are cyclic), any such downward traversal is guaranteed to propagate the task to each node of the tree once and only once, hence enabling each object 104 to process the task once and only once. However, the manner in which the propagation occurs may vary by task.

As further illustrated in the example scenario 100 of FIG. 1, the objects 104 of the object set 102 may be traversed in an ownership order 108 that reflects the ownership relationships 106 among the objects 104 in order to complete a task. The ownership order 108 reflects a depth-first traversal of the tree, in which each object 104 that is visited first propagates the visit downward to each and every child, and then applies the visit to the object. For example, in this ownership order 108, a task may be initiated with the first object 104 (e.g., representing a main window of an application featuring a graphical user interface), which may first pass the task to the second object 104, which in turn passes the task along to the fourth object 104, which in turn passes the task to the seventh object 104. The seventh object 104 has no child nodes, and therefore executes the task before returning the processing of the task to the fourth object 104. The fourth object then passes the task in turn to the tenth object 104 and the eleventh object 104, each of which processes the task, and processing of the task returns to the eighth object 104, which, having completed processing of the task for all of its child nodes, applies the task to itself. Such depth-first processing continues until all child nodes of the first object 104 have processed the task, at which point the first object 104 finally processes the task and reports a completion of the task.

Many such tasks may utilize an ownership traversal 110 of the object set 102 that produces an ownership order 108 of the objects 104 reflecting the ownership relationships 106 thereamong. As a first example, the task may comprise saving the state of the object set 102, e.g., as a memory snapshot for backup and later retrieval to restore the state of the object set 102 to a selected point in time. As a second example, the object set 102 may be subjected to a time-slicing processing environment, wherein respective objects 104 are provided an opportunity to conduct some processing for a brief duration, and it may be desirable to permit a set of contained objects 104 to process first and pass any resulting messages from the processing upward to a containing object 104 for coordination or further handling. The orderly traversal of the object set 102 to accomplish such tasks may therefore utilize the structure of the object set 102 to yield an ownership traversal 110 that is consistent with the ownership order 108 of the object set 102.

However, for other tasks, different traversal techniques may be more useful. For example, an same object set 102 may be utilized to render a scene of the objects 104, e.g., a two- or three-dimensional presentation from a particular perspective, and the selected perspective of the scene may exhibit a variable distance to the respective objects 104. In some circumstances, the perspective may be fixed (e.g., in a traditional desktop environment, a fixed perspective that is situated above the desktop surface upon which a set of windows is organized by z-order). In other circumstances, the perspective may be dynamic (e.g., in a three-dimensional scene, the user may move the perspective to navigate among a set of volumetric objects 104). In such circumstances, the rendering of the scene in a visually correct and efficient manner may involve traversing the scene according to the distances. For example, displaying a scene according to a back-to-front order involves rendering the entirety of each object in order of distance. The most distant object is fully drawn, followed by the next nearest object, etc., until the nearest object is drawn last, such that regions of the display in which portions of the objects overlap are resolved in favor of the nearest such object. Basic implementations of such techniques may present inefficiencies that may be alleviated through optimization (e.g., rather than fully drawing a first object and then drawing a closer object over part or all of the first object, the drawing may involve detecting the overlapping portions of the objects and refraining from drawing overlapped portions of the first object), which may involve adapting the traversal order of the objects 104, but in general such rendering may preserve and exhibit the general drawing order of the objects 104.

Figure 2:
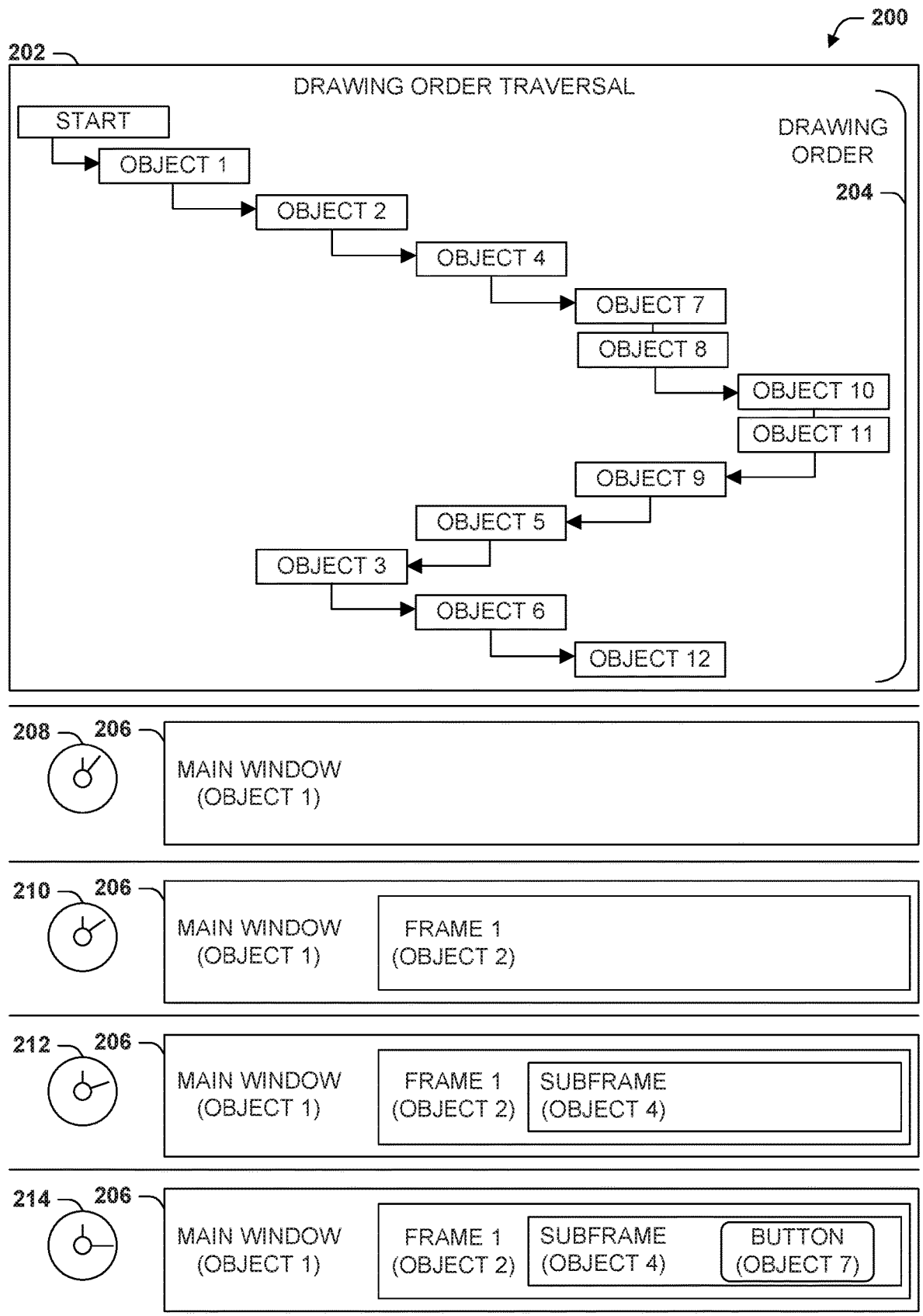
FIG. 2 is an illustration of an example scenario featuring a drawing traversal of the object set of FIG. 1 according to a drawing order to achieve an incremental rendering of the object set.

In the example scenario 200 of FIG. 2, the same object set 102 as presented in FIG. 1 is rendered using a drawing order traversal 202 in which the objects are visited in drawing order 204 based upon the visual distances of the objects 104 from the perspective. At a first time 208, the object set 102 is examined for the object 104 that is furthest from the perspective, such as a window 206 or user control exhibiting the lowest z-order value. This object 104 (e.g., the first object 104 represented as the root node of the object set 102) is drawn first, e.g., to initiate the rendering by drawing the containing frame and background of the window 206 that visually encapsulates the other user interface controls. At a second time 210, the object set 102 is examined for the second-furthest visual control, such as a frame within the window 206 that encapsulates a subset of the user controls, and the frame may be drawn into the rendering over the window 206. At a third time 212, the object set 102 is examined for the third-furthest visual control, such as a subframe of the frame of the window 206, which is also drawn into the rendering over the frame and the window 206; and at a fourth time 214, a fourth-furthest visual control within the object set 102 is identified and drawn into the rendering as a button within the subframe.

However, achieving the drawing order 204 through the inspection of this example object set 102 may be somewhat more difficult, since the object set 102 is structured according to the ownership relationships 106. As a first example, some object sets 102 may be organized in such a manner that the z-order markedly differs from the ownership organization, such that identifying the most distant not-yet-rendered object 104 involves a review of all such objects 104, and/or a sorting of the entire object set 102 by distance. Such examination may be extensive if the object set 102 is large. Additionally, in some scenarios, the examination may have to be conducted repeatedly (e.g., if the objects 104 are dynamic such that the z-order frequently changes, or the perspective of the user changes, such as during navigation within a three-dimensional scene). In such circumstances, the inefficiency of performing a full back-to-front ordering over the object set 102 may be difficult to reconcile with other considerations, such as promoting processing efficiency on a mobile device in order to extend battery life or maintaining a high framerate when the object set 102 is repeatedly rendered for a display.

Some techniques for addressing these sources of inefficiency involve reorganizing the object set 102 according to a drawing order 204; e.g., the tree may be resorted to position the closest and/or most distant objects 104 as the leaf nodes, such that a depth-first or breadth-first traversal produces the drawing order 204. However, such reorganization may not preserve the ownership relationships 106 among the objects 104, such that ownership relationships are not maintained.

Alternatively, the object set 102 may be concurrently organized as a first data structure that reflects ownership relationships 106 and a second data structure that reflects the drawing order 204. However, such dual representation may present new sources of inefficiency, such as memory consumption incurred by maintaining two distinct sets of links among all of the objects 104 of the object set 102. Further problems and sources of inefficiency may arise in maintaining synchrony among the data structures; e.g., removing a single object 104 from the object set 102 may involve an extensive revision of both data structures, possibly including rebalancing one or both trees in quite different ways. Moreover, synchronization discrepancies may result in semantic inconsistencies, e.g., where an object 104 exists in the first data structure (representing ownership relationships 106) but not the second data structure (representing the drawing order 204). Failure to understand and abide by the logical subtleties of the different data structures may therefore present logical errors that produce incorrect processing results (e.g., an object appearing in a scene that does not exist in the ownership hierarchy), and in some circumstances data corruption or application failure.

Additionally, in some circumstances, a diverse object set 102 may present collections of objects 104 that are to be traversed in different ways. For example, a graphical environment may present windows with different visual characteristics, wherein some windows are rendered according to a back-to-front ordering (e.g., drawing the furthest, encapsulating controls, such as a window border, and then incrementally drawing overlapping controls). However, other windows may be rendered in a different manner (e.g., rendering some controls that hover over a background, and then rendering the background with a drop shadow that is cast upon the background by the controls) that involves a different order. It may therefore be efficient to provide a flexible traversal mechanism in which different portions of an object set 102 may be traversed in different ways, and in particular for different tasks and/or different subsets of objects 104 of the object set 102.

B. Presented Techniques

Figure 3:
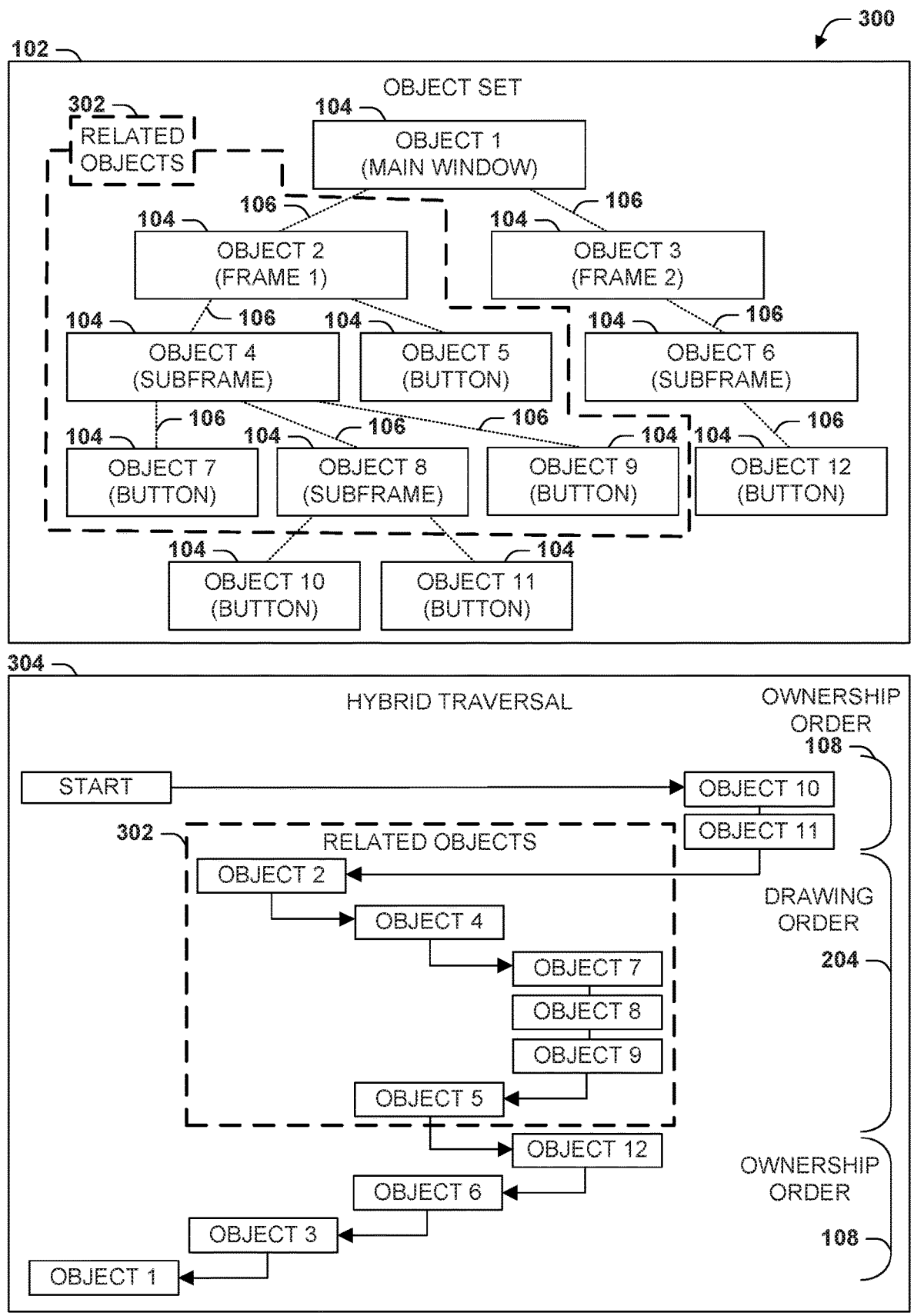
FIG. 3 is an illustration of an example scenario featuring a rendering of the object set of FIG. 1 according to a hybrid traversal in accordance with the techniques presented herein.

FIG. 3 is an illustration of an example evaluation of the object set 102 of FIG. 1 using an hybrid traversal 304 in accordance with the techniques presented herein.

In this example scenario 300, the object set 102 is organized according to ownership relationships 106, wherein a relationship between a parent node and a child node indicates a first object 104 that encapsulates or owns a second object 104. A request is received to render a scene of the object set 102, such as a three-dimensional rendering of volumetric objects 104 or a two-dimensional presentation of a set of planar objects such as windows 206. The rendering may be achieved in a manner that reflects both an ownership order 108 according to the ownership relationships 106 among the objects 104 and the drawing order 108 of the objects 104, such as the comparative distances of the objects 104 from a perspective within the scene. The hybrid traversal 304 is achieved by identifying a subset of related objects 104 of the object set 102, and a drawing order 204 particularly among the related objects 104 of the subset. The hybrid traversal 304 of the object set 102 is then performed according to the drawing order 204 for the subset of the related objects 302, and according to the ownership order 108 for the remainder of the object set 102. The scene may then be rendered according to the hybrid traversal 304 and presented to fulfill the request. The traversal of the object set 102 therefore exhibits a combination of the drawing order 204 among subsets of related objects 302 and the ownership order 108 for the remainder of the traversal in accordance with the techniques presented herein.

A more detailed explanation of the hybrid traversal 304 begins with a traversal of the object set 102 starting at the first object 104 representing a main window 206 in order to complete a drawing task. Instead of first drawing the first object 104, the ownership order 108 may propagate the drawing task to the child nodes of the first object 104, including the second object 104 and the third object 104. The second object 104 includes the subset of related objects 302, so the drawing task is first propagated downward to any child nodes of the related objects 302 that are not among the related objects 302 (e.g., the tenth object 104 and the eleventh object 104), which are traversed and rendered according to the ownership order 108. Returning to the eighth object 104, the traversal identifies that the eighth object 104 is a member of the subset of related objects 302, and therefore transitions to a traversal according to a drawing order 204 among the related object 302, e.g., identifying a z-order among the subset of related objects 104 and rendering the objects 104 in a back-to-front order. This type of hybrid traversal 304 may be advantageous, e.g., because the tenth object 104 and eleventh object 104 may be regarded as integral with the eighth object 104, such that any z-order comparison of the eighth object 104 with the other objects 104 of the subset of related objects 302 also implicitly applies to the tenth and eleventh objects 104, which do not have to be considered individually. Moreover, when the time arrives to render the eighth object 104 according to the drawing order 204, the contents of the eighth object 104 are completely available (because the tenth object 104 and eleventh object 104 were previously rendered), and the eighth object 104 may be rendered as a single rendering operation in a single ordinal position within the drawing order 204. When all of the objects 104 in the subset of related objects 302 have been fully rendered into the scene according to the drawing order 204, the rendering task may return to the first object 104, and ownership order 108 may be applied to the remaining objects 104 as well as the first object 104. In this manner, the hybrid traversal 304 may utilize the drawing order 204 for subsets of related objects 302, and the ownership order 108 for the remainder of the object set 102, in accordance with the techniques presented herein.

C. Technical Effects

The distributed transaction processing techniques presented herein may exhibit a number of technical advantages as compared with other traversal techniques.

A first technical effect that may be achieved through the techniques presented herein involves the efficiency of the traversal process. As a first such example, when performing a drawing order analysis of the objects 104 to determine the rendering order, it may not be advantageous to apply a full m-to-n comparison of each object 104 to each other object 104, particularly for objects 104 that are not near each other or that are within different containers, such as buttons within different windows 206. Rather, it may be advantageous to limit the application of drawing order 204 to a subset of related objects 302, which may be clustered close together (e.g., the user interface controls of a single window 206 or frame). The hybrid traversal 304 allows the drawing order 204 to be applied selectively among the related objects 302. As a second such example, the hybrid traversal 304 enables drawing order to be applied to selected subsets of related objects 302 while maintaining the actual structure of the object set 102 in an ownership order 108 that is usable for other tasks. The realization of a hybrid traversal 304 may be more memory- and/or processor-efficient than maintaining separate data structures for tasks that utilize a drawing order 204 (e.g., drawing) and tasks that utilize an ownership order 108 (e.g., state saving). As a third such example, some embodiments of the techniques presented herein involve the identification of related objects 302 according to a modest modification of the object set 102, such as a small set of metadata attached to a tree that identifies the subsets of related objects 302. In one such embodiment, at least some objects 104 of the object set 102 may include a flag or group identifier, and sets of contiguous nodes in a tree that share a value for the flag or group identifier may be construed as a subset of related objects 302. Such techniques may therefore enable the identification of the related objects 302 with only a modest addition of metadata, and may also be more computationally efficient process of identifying the related objects 302 than an ad-hoc identification process.

Another example of the efficiency that may be achieved by the hybrid traversal 304 is the facilitation of rendering effects in which a first object 104 that is closer to the perspective than the second object 104. In such scenarios, a typical drawing order 204 may result in a complete rendering of the second object 104 prior to initiating rendering of the first object 104, which may make it difficult to realize rendering effects such as drop shadows cast by the first object 104 on the second object 104 and/or a translucent portion of the first object 104 through which at least a portion of the second object 104 is visible. Typically, such rendering effects are achieved through complex graphics pipelines, such as raytracing, that may not be suitable for the rendering of some object sets 102, such as a two-dimensional presentation of application windows and user interfaces in a graphical computing environment. That is, applying a raytracing model to a set of windows may unnecessarily involve computationally robust but power-consuming graphics processing capabilities, such as the use of a graphics processing unit (GPU) that may reduce the battery life of a device such as a mobile phone. The hybrid traversal 304 of the object set 102 in accordance with the techniques presented herein may enable the realization of some rendering effects in the rendering of such object sets 102 in a manner that does not involve computationally intensive operations.

A second technical effect that may be achieved through the techniques presented herein involves the use of the ownership order 108 for other objects 302 that are owned by the related objects 302 enables the owned objects 302 to be rendered first, and therefore available for rendering as part of the owning object 104 of the related objects 302, and in the ordinal position of such ordering. For example, in the example hybrid traversal 304 of FIG. 3, when rendering of the eighth object 104 is initiated according to the drawing order 204, the tenth object 104 and the eleventh object 104 may have already been rendered (irrespective of their z-order relative to any of the related objects 302) and therefore may be ready for inclusion in the rendering of the eighth object 104. This particular example may even present an inversion of the full m-to-n drawing order 204 if the tenth object 104 and the eleventh object 104 are in front of the eighth object 104, and such inversion may be desirable, e.g., if the renderings of the tenth object 104 and the eleventh object 104 are integrated with the rendering of the eighth object 104, such as the depiction of a drop shadow cast by the tenth and eleventh objects 104 on a background object presented by the eighth object 104.

A third technical effect that may be achieved through the techniques presented herein involves the adaptability of the object set 102 for different forms of traversal for different tasks and/or different portions of the object set 102. As a first such example, the same data structure may be traversed (e.g.) entirely according to the ownership order 108, for tasks such as state saving, and may be traversed by the hybrid traversal 304 for tasks such as drawing. As a second such example, the hybrid traversal 304 may enable different traversal techniques to be identified for different subsets of related objects 302 in the object set 102. For example, the object set 102 may comprise a collection of applications, where some applications utilize an ownership order 108 to render the objects 104 contained therein, and other applications utilize a drawing order 204 to render the objects 104 contained therein. The adaptation of the object set 102 to support hybrid traversal 304 may enable the traversal order to vary for different portions of the object set 102, producing an overall traversal order that reflects different logical ordering priorities for different portions of the object set 102. Many such advantages may arise from the adaptation of an object set 102 to support various forms of hybrid traversal 304 in accordance with the techniques presented herein.

D. Example Embodiments

Figure 4:
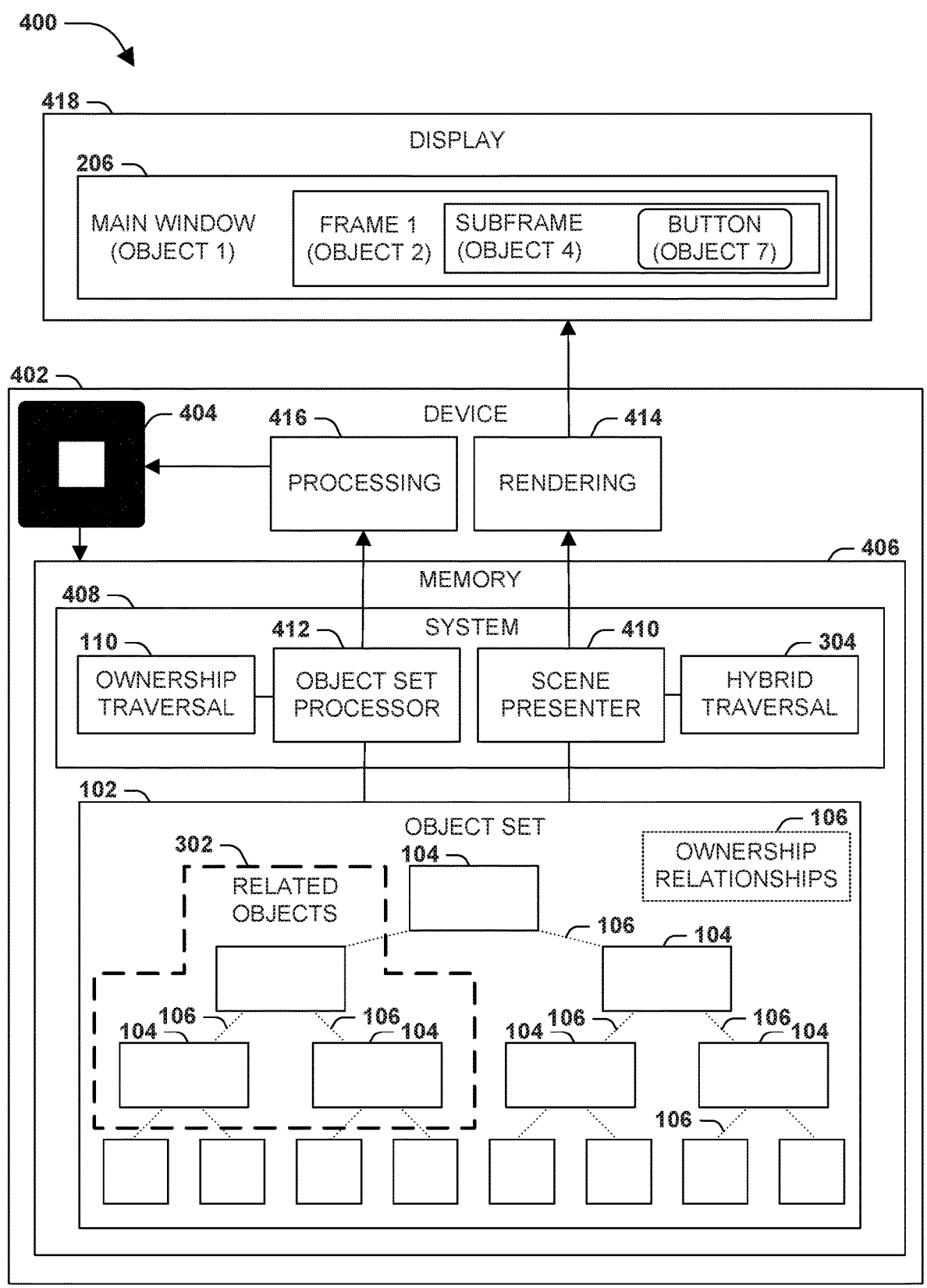
FIG. 4 is an illustration of an example scenario featuring an example device and an example system that presents an object set of objects in accordance with the techniques presented herein.

FIG. 4 is an illustration of an example scenario 400 featuring some example embodiments of the techniques presented herein, including an example device 402 comprising an example system 408 that represents and presents an object set 102 in accordance with the techniques presented herein.

In this example scenario 400, the example device 402 comprises a processor 404 and a memory 406 (e.g., a memory circuit, a platter of a hard disk drive, a solid-state storage device, or a magnetic or optical disc) storing an object set 102 of objects 104 that are organized by a ownership order 108 reflecting ownership relationships 106 among the objects 104. As an example, the object set 102 may be organized as a tree, and the ownership order 108 may comprise connections between nodes of the tree, wherein a pair of related nodes comprising a parent node and a child node represent a pair of objects 104 including an owning or encapsulating object 104 and an owned or encapsulated object 104. The object set 102 may also exhibit other structures, such as records of a relational database where the ownership relationships 106 are represented as relational references between records. The memory 406 also encodes instructions that, when executed by the processor 404 of the example device 402, cause the example device 402 to provide a system 408 for representing and presenting the object set 102. In particular, the example system 408 comprises a scene presenter 410, which responds to request to present the objects 104 of the object set 102 (e.g., as a two- or three-dimensional rendering presented on a display 418, which may be part of the example device 402 or part of another device for which the scene presenter 410 presents the object set). The scene presenter 410 fulfills the request by applying a hybrid traversal 304, in accordance with the techniques presented herein, by identifying a subset of related objects 302 of the object set 102 and a drawing order 204 of the related objects 302 of the subset. The scene presenter 410 performs the hybrid traversal 304 of the object set 102 using the drawing order 204 for the subset of the related objects 302, and using the ownership order 108 for a remainder of the object set 102. The scene presenter 410 then performing a rendering 414 of the objects 104 into the scene according to the hybrid traversal 304 and presents the scene generated by the rendering 414 (e.g., displaying the scene on the display 418, such as displaying a window 206 of user interface controls on a display component of the example device 402, or transmitting the rendering to a receiving device via local or remote connection for presentation on a display component of the receiving device). Additionally and although not required of all embodiments, the example system 408 in the example scenario 400 of FIG. 4 also comprises an object set processor 412 that receives a request to perform a processing 416 of the object set 102, such as performing a task on each of the objects 104. The object processor 412 fulfills the request for processing 416 using only an ownership traversal 110 for all objects 104 of the object set 102, including the subset of related objects 302 that are traversed in the drawing order during the hybrid traversal 304 performed by the scene presenter 410. In this manner, the components of the example system 408 enable the example device 402 to represent and present the object set 102 in accordance with the techniques presented herein.

Figure 5:
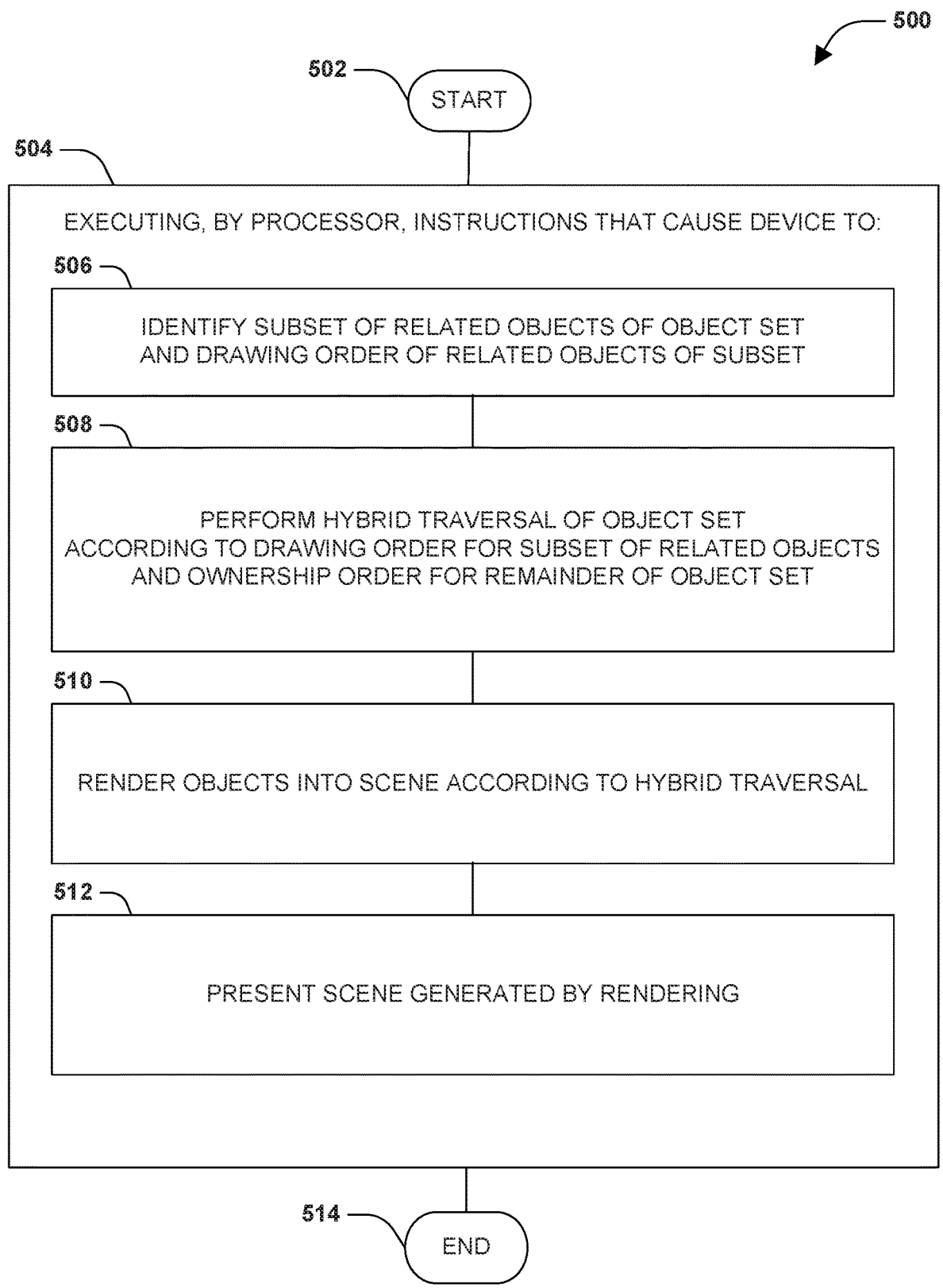
FIG. 5 is a flow diagram illustrating an example method of presenting an object set of objects in accordance with the techniques presented herein.

FIG. 5 is an illustration of an example scenario featuring a third example embodiment of the techniques presented herein, wherein the example embodiment comprises an example method 500 of presenting a scene of objects 104 in an object set 102 that are organized by a ownership order 108 reflecting ownership relationships among the objects 104. The example method 500 involves a device comprising a processor 404, and may be implemented, e.g., as a set of instructions stored in a memory 406 of the device, such as firmware, system memory, a hard disk drive, a solid-state storage component, or a magnetic or optical medium, wherein the execution of the instructions by the processor 404 causes the device to operate in accordance with the techniques presented herein. As an example, the instructions may comprise a runtime stored by and/or accessible to the example device 402 that encodes instructions that may be invoked by an operating system of the example device 402 to request a rendering 414 of the object set 102.

The example method 500 begins at 502 and involves executing 504, by the processor 404, instructions that cause the device to present the scene using a hybrid traversal 304 in accordance with the techniques presented herein. More particularly, executing 504 the instructions causes the device to identify 506 a subset of related objects 302 of the object set 102 and a drawing order 204 of the related objects 302 of the subset. Executing 504 the instructions further causes the device to perform 508 a hybrid traversal 304 of the object set 102, according to and using the drawing order 204 for the subset of the related objects 302, and according to and using the ownership order 108 for a remainder of the object set 102. Executing 504 the instructions further causes the device to perform a rendering 510 of the objects 104 into the scene according to the hybrid traversal 304, and to present 512 the scene generated by the rendering 510. In this manner, the example method 500 enables the example device to present the object set 102 as a scene of objects 104 using the hybrid traversal 304 in accordance with the techniques presented herein, and so ends at 514.

Figure 6:
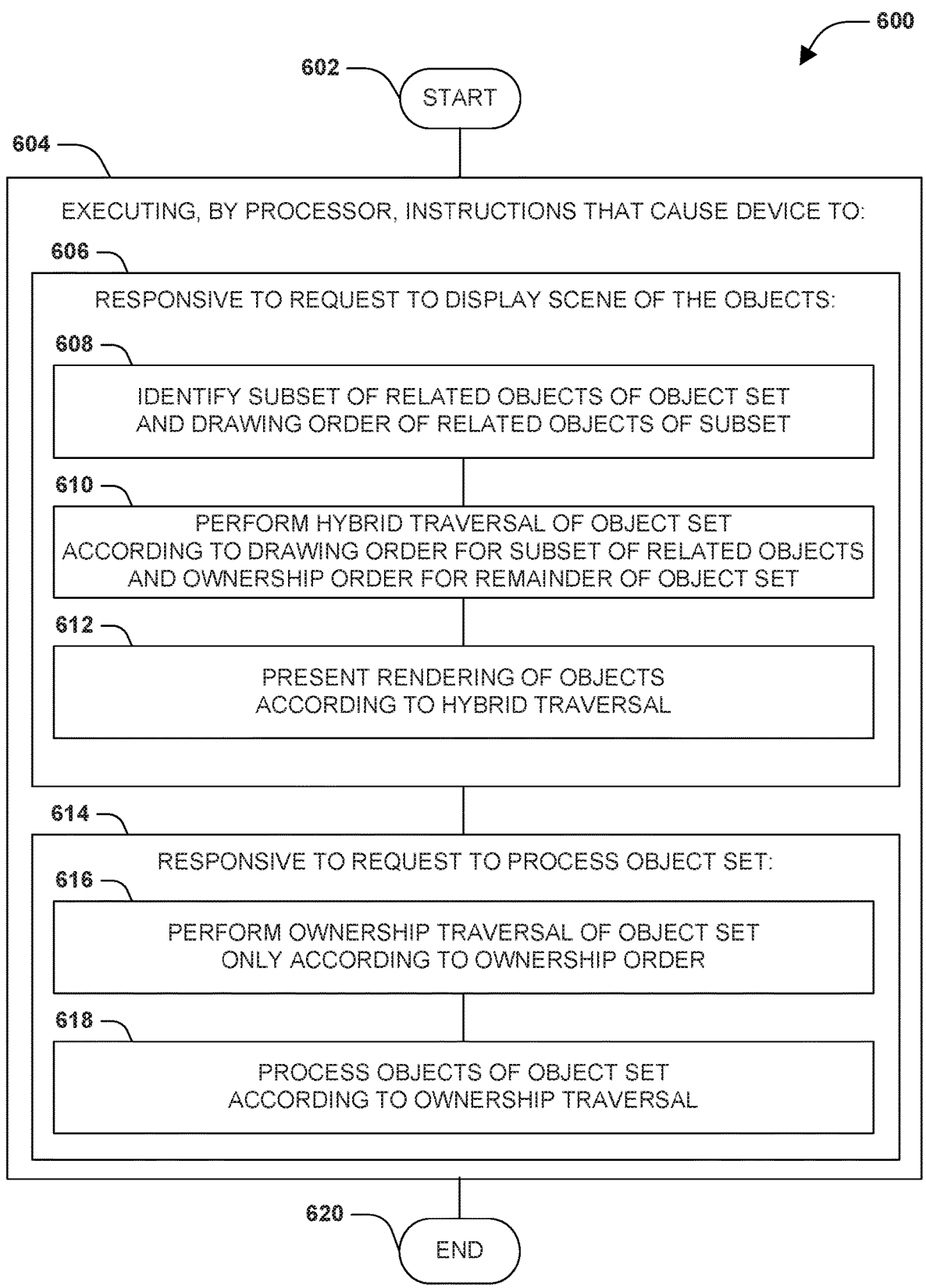
FIG. 6 is a flow diagram illustrating an example method of representing an object set of objects in accordance with the techniques presented herein.

FIG. 6 is an illustration of an example scenario featuring a third example embodiment of the techniques presented herein, wherein the example embodiment comprises an example method 600 of representing a scene of objects 104 in an object set 102 that are organized by a ownership order 108 reflecting ownership relationships among the objects 104. The example method 600 involves a device comprising a processor 404, and may be implemented, e.g., as a set of instructions stored in a memory 406 of the device, such as firmware, system memory, a hard disk drive, a solid-state storage component, or a magnetic or optical medium, wherein the execution of the instructions by the processor 404 causes the device to operate in accordance with the techniques presented herein. As an example, the instructions may comprise a runtime stored by and/or accessible to the example device 402 that encodes instructions that may be invoked by an operating system of the example device 402 to represent the object set 102.

The example method 600 begins at 602 and involves executing 604, by the processor 404, instructions that cause the device to represent the scene using a hybrid traversal 304 in accordance with the techniques presented herein. More particularly, executing 604 the instructions causes the device to receive a request 606 to display a scene of the objects 104. Execution 604 of the instructions causes the device to respond to the request 606 by identifying 608 a subset of related objects 302 of the object set 102 and a drawing order 204 of the related objects 302 of the subset; performing 610 a hybrid traversal 304 of the object set 102, according to and using the drawing order 204 for the subset of the related objects 302, and according to and using the ownership order 1080 for a remainder of the object set 102; and presenting 612 a rendering of the objects 104 according to the hybrid traversal 304. Executing 604 the instructions further causes the device to receive a request 614 to process the objects 104 of the object set 102. Execution 604 of the instructions causes the device to respond to the request 614 by performing 616 an ownership traversal 110 of the object set 102 only according to the ownership order 108, including for the subset of related objects 302 that are processed in the drawing order 204 in the hybrid traversal 304. Execution 604 of the instructions also causes the device to process 618 the objects 104 of the object set 102 according to the ownership traversal 110. In this manner, the example method 600 enables the example device to represent the object set 102 as a scene of objects 104 using the hybrid traversal 304 in accordance with the techniques presented herein, and so ends at 620.

Still another embodiment involves a computer-readable medium comprising processor-executable instructions configured to apply the techniques presented herein. Such computer-readable media may include various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein. Such computer-readable media may also include (as a class of technologies that excludes communications media) computer-computer-readable memory devices, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein.

Figure 7:
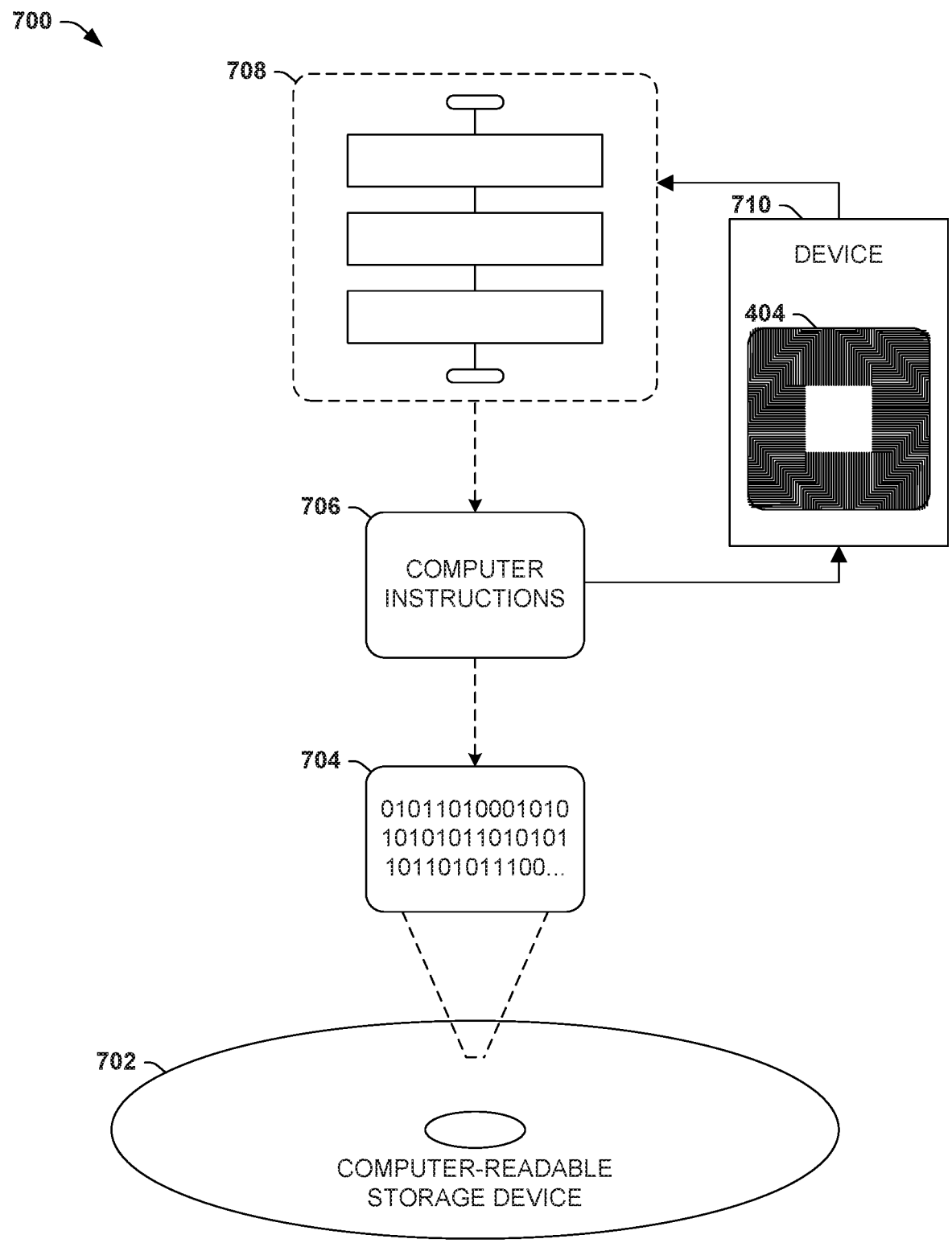
FIG. 7 is an illustration of an example computer-readable medium storing instructions that provide an embodiment of the techniques presented herein.

An example computer-readable medium that may be devised in these ways is illustrated in FIG. 7, wherein the implementation 700 comprises a computer-readable memory device 702 (e.g., a CD-R, DVD-R, or a platter of a hard disk drive), on which is encoded computer-readable data 704. This computer-readable data 704 in turn comprises a set of computer instructions 706 that, when executed on a processor 404 of a device, cause the device to operate according to the principles set forth herein. For example, the processor-executable instructions 706 may encode a system that causes the device to represent and present an object set 102 of objects 104 according to a hybrid traversal 304, such as the example system 408 of FIG. 4. As another example, the processor-executable instructions 706 may encode a method of causing a device to represent and present an object set 102 of objects, such as the example method 500 of FIG. 5 and/or the example method 600 of FIG. 6. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example device 402 of FIG. 4; the example system 408 of FIG. 4; the example method of FIG. 5; the example method 600 of FIG. 6; and/or the example computer-readable storage device 702 of FIG. 7) to confer individual and/or synergistic advantages upon such embodiments.

E1. Scenarios

A first aspect that may vary among implementations of these techniques relates to scenarios in which the presented techniques may be utilized.

As a second variation of this first aspect, the presented techniques may be utilized with a variety of devices, such as workstations, laptops, consoles, tablets, phones, portable media and/or game players, embedded systems, appliances, vehicles, and wearable devices. The device may also comprise a collection of individual device units, such as a collection of processes executing on one or more processors of one or more devices. Such devices may be interconnected in a variety of ways, such as locally wired connections (e.g., a bus architecture such as Universal Serial Bus (USB) or a locally wired network such as Ethernet); locally wireless connections (e.g., Bluetooth connections or a WiFi network); remote wired connections (e.g., long-distance fiber optic connections comprising Internet); and/or remote wireless connections (e.g., cellular communication).

As a third variation of this first aspect, the object set 102 may comprise a variety of objects 104, such as individual class-based objects that are interrelated in one or more data structures such as trees, object graphs, or hashtables; portions of a document encoded in a structured language such as a variant of the Extensible Markup Language (XML); or records in a relational or non-relational database. The objects 104 may represent a variety of entities, including as volumetric objects in a three-dimensional space; individual user controls in a user interface of an application; or user interfaces of multiple applications within an operating system space. The rendering of the object set 102 may produce a two- or three-dimensional representations using a variety of rendering techniques, and may be presented on a display 418 integrated with an example device 402 representing an embodiment, or on a display 418 of another device to which an embodiment of the currently presented techniques transmits a rendering 414 of the object set 102. In some embodiments, the rendering 414 may comprise non-graphical and even non-visual components, such as text or audio. Additionally, such renderings 414 may be utilized in a variety of contexts, such as a presentation of a user interface of an application; a presentation of a collection of applications in a computing environment; and a presentation of a two- or three-dimensional scene in an application such as a media or content viewer or a game, optionally including virtual-reality and/or alternate-reality applications. Many such variations may be presented by the scenarios in which the techniques presented herein may be effectively utilized.

E2. Identification of Subset of Related Objects

A second aspect that may vary among embodiments of the currently presented techniques involves the identification of the subset of related objects 302 of the object set 102 in order to apply the hybrid traversal 304 to the subset.

Figure 8:
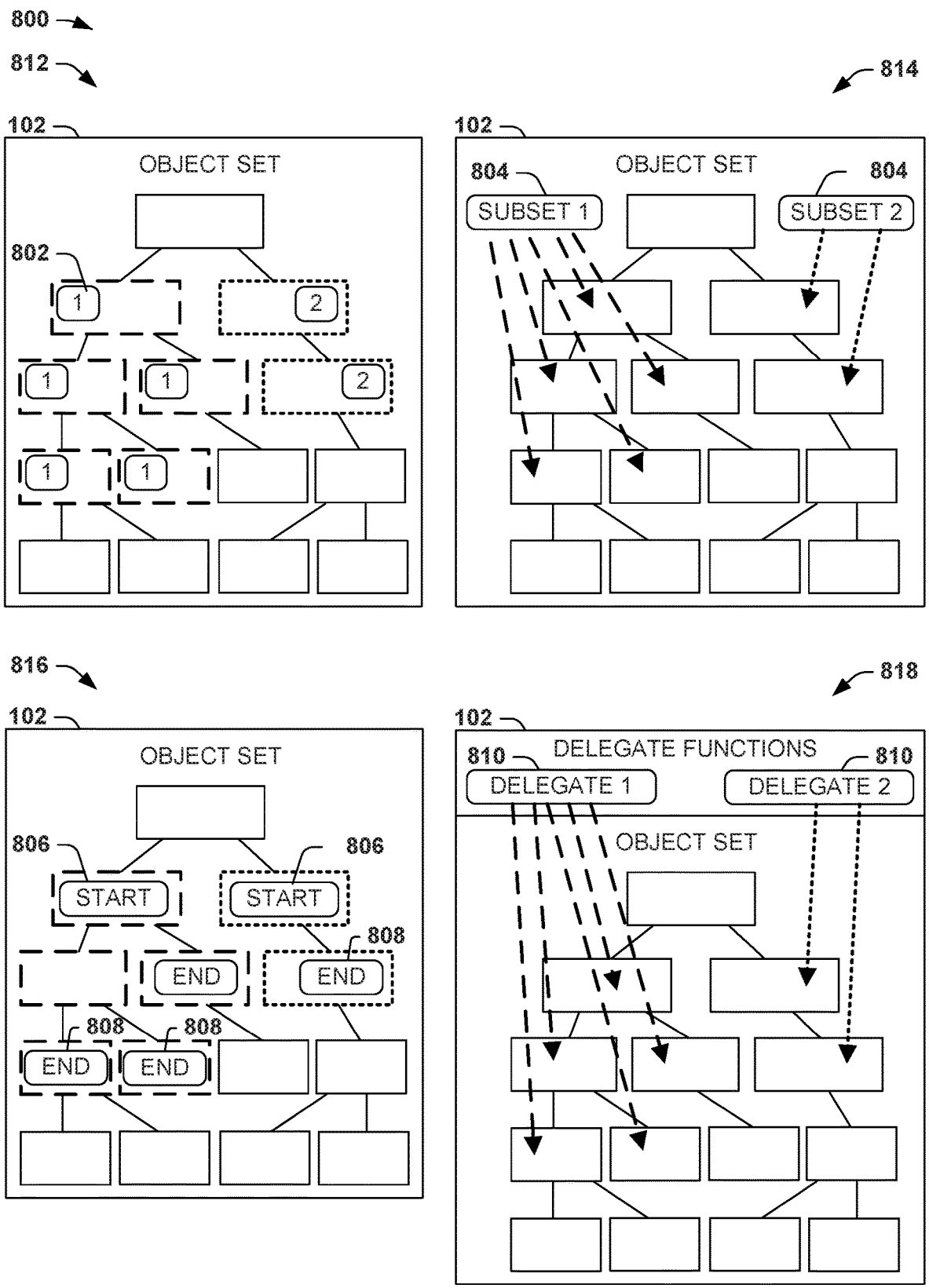
FIG. 8 is an illustration of a set of example scenarios featuring variations in the identification of the subset of related nodes in accordance with the techniques presented herein.

FIG. 8 is an illustration of a set of example scenarios 800 featuring variations in the identification of the subset of related objects 302 using various types of metadata that are associated with the object set 102.

A first set of variations involve a relatively static identification of the subsets of related objects 302 based on an annotation of the object set 102. Such techniques may be advantageous, e.g., where the object set 102 is relatively static, such as a collection of applications with relatively static compositions of user interface elements. The annotation of the object set 102 may be performed prior to receiving a rendering request (e.g., initiated with an instantiation of the operating environment and updated when application instances are created or destroyed) and/or in a cached manner (e.g., performing a full analysis of the object set 102 during a first rendering and saving the results in a cache to expedite subsequent rendering).

As a first example 812, the related objects 302 may be identified using a field 802 that is attached to and/or associated with at least the related objects 302 of one or more subsets of the object set 102. The field 802 may comprise a value, and the related objects 302 comprising the subset may be identified by identifying the objects 104 of the object set 102 that share the value of the field that identifies the subset of related objects 302. In one such variation, the value of the field 802 is unique for each subset of related objects 302, such that all objects 104 positioned anywhere in the object set 102 and that share the value of the field 802 are identified as members of the subset of related objects 302. In another such variation, the value of the field 802 may not necessarily be unique for each subset of related objects 302, but may at least be distinctive for a collection of contiguous objects 104 within the object set 102, wherein a first object 104 and a second object 104 that share an ownership relationship are contiguous (e.g., a subtree of a tree structure). This variation may enable a more relaxed labeling and association of related objects 302 of the subset As a second example 814, the object set 102 may include one or more containers 804 that identify the objects 104 of the object set 102 comprising the related objects 302 of the subset. A container 804 may comprise, e.g., an ordered or unordered list of references or identifiers of objects 104 that comprise a subset of related objects 302. Identifying the subset of related objects 302 may therefore involve identifying the objects 104 that are referenced by the respective containers 804. This example may be advantageous, e.g., by facilitating the rapid identification of the subsets of related objects 302 without having to examine the contents of the object set 102 (which may be large and/or dynamic). As one example, if the objects 104 comprise user interface elements of respective applications (some of which may be embedded in other applications, such as in a component or extension model), a rendering pipeline may involve initiating requests to the respective applications to render the related objects 302 of the respective subsets thereof according to a drawing order 204 (e.g., in a back-to-front manner), and while such applications perform the rendering, traversing the object set 102 in the ownership order to initiate rendering of the remaining objects 104 of the object set 102 (e.g., so that contained components are ready for aggregation with the rendering of a parent or containing application).

As a third example 816, the hierarchical structure of the object set 102 may be utilized to identify the subset of related objects 302 by identifying a region of contiguous objects 104 that together comprise a subset of related objects 302. For example, a first object 104 may comprise a subset start indicator 806, and one or more second objects 104 may comprise a subset end indicator 808. The subset of related objects 302 may be identified as the collection of contiguous objects 104 within the region or subtree that is demarcated by a subset start indicator 806 and a subset end indicator 808. This variation may be advantageous, e.g., for enabling a large and/or dynamic subset of objects 104 to be identified as related objects 302 simply by changing the locations of the subset start indicator 806 and/or subset end indicators 808, without having to update the intermediate objects 104 of the subset of related objects 302.

Other variations of this second aspect involve an ad-hoc evaluation of the object set 102 to detect the subsets of related objects 302. Such variations may be advantageous, e.g., where the object set 102 is highly dynamic, such as three-dimensional scenes with comparatively ephemeral objects and/or fluid changes to the subsets of related objects 302.

As a fourth example 818, the object set 102 may further comprise one or more delegate functions 810 that respectively identify the objects 104 comprising one or more subsets of related objects 302 within the object set 102. A subset of related objects 302 may be identified by invoking the delegate function 810 that identify or claim the objects 104 comprising the subset of related objects 302 within the object set 102. Each delegate function 810 may produce a list of objects 104 within the object set 102 that comprise a subset of related objects 302.

As a fifth example (not shown), a general request (e.g., a broadcast to all applications within an operating environment or entities within a scene) may be initiated, e.g. early in a rendering loop, as a request for respective entities to claim the objects 104 of the object set 102 that comprise the subset of related objects 302. An embodiment may therefore identify the subsets of related objects 302 by receiving one or more claim that at least one object 104 are within the subset of related objects 302. Many such variations may be used to identify the subsets of related objects 302 within the object set 102 in accordance with the techniques presented herein.

E3. Hybrid Traversal Variations

A third aspect that may vary among embodiments of the currently presented techniques involves variations in the hybrid traversal 304 of the object set 102. In many such embodiments, the hybrid traversal 304 involves a rendering of one or more subsets of related objects 302 of the object set 102 according to a drawing order 204 among the related objects 302, and the use of an ownership order 108 to traverse a remainder of objects 104 of the object set 102; however, the particular manner in which such hybrid traversal 304 is achieved may vary among embodiments of the techniques presented herein.

Figure 9:
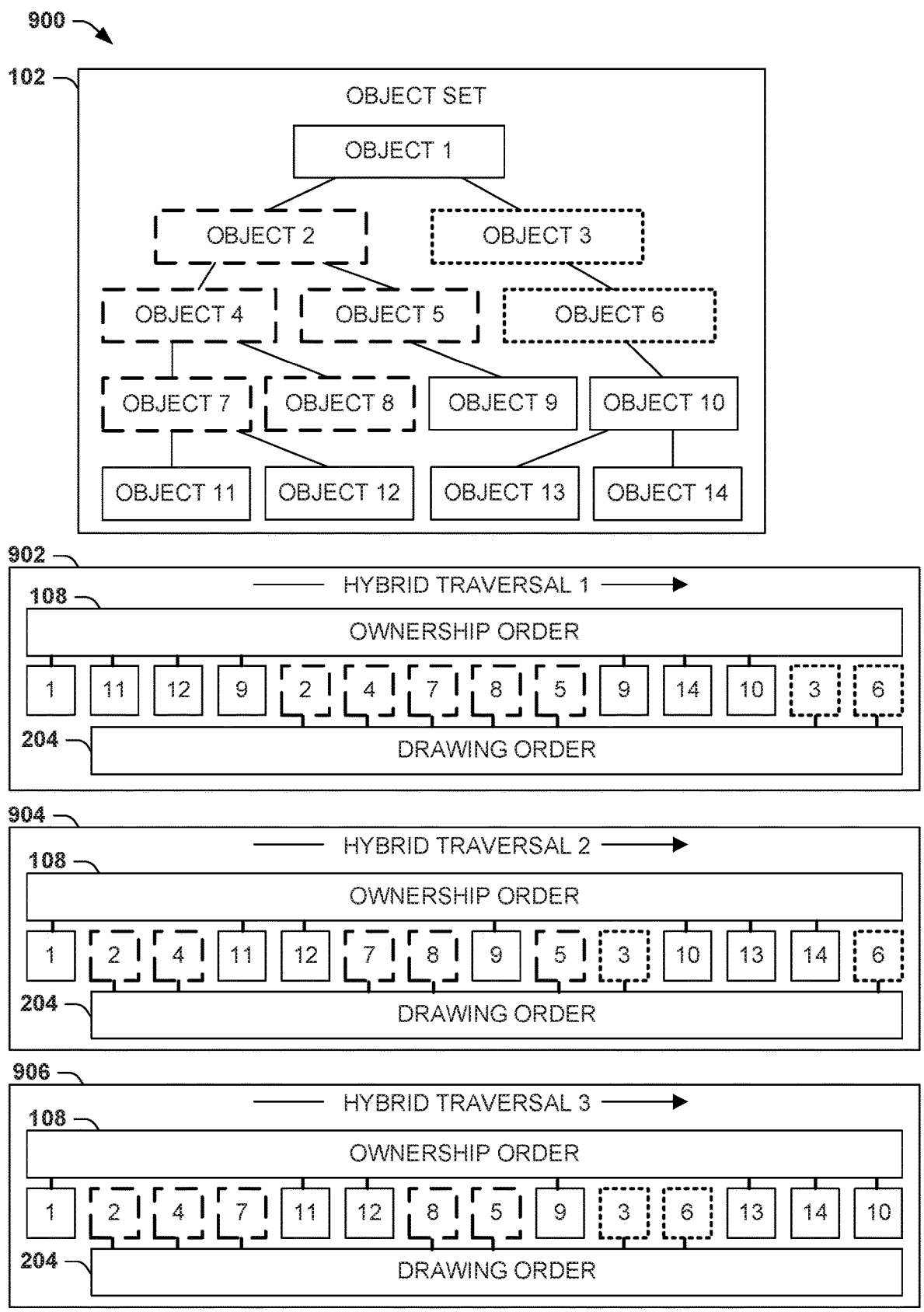
FIG. 9 is an illustration of a set of example hybrid traversals of an object set in accordance with the techniques presented herein.

FIG. 9 is an illustration of an example scenario 900 featuring a set of example hybrid traversals. In this example scenario 900, an object set 102 comprises two subsets of related objects 302; e.g., the object set 102 may comprise a graphical computing environment, the objects 104 may comprise individual user interface controls, and the subsets of related objects 302 may comprise applications that present a user interface as a subset of the user interface controls. Some selected objects 104 (such as objects 11, 12, 9, and 10) are directly owned or encapsulated by a subset of related objects 302 representing the user interface for an application, but the selected objects 104 are not part of the subset; such selected objects 104 may comprise, e.g., child windows that are modally or modelessly associated with and/or owned by an application, but that are not components of the main window of the application that is represented by the subset of related objects 302. If such child windows are not positioned within or near the application window, it may not be sensible to evaluate a drawing order of the user interface elements of the child window together with those of the parent window. According to these considerations, the selected objects are represented in the object set 102 as being owned by a user interface element of the application window, and yet are not included in the subset of related objects 302 representing the application window.

As a first variation of this third aspect, and as depicted in the example scenario 900 of FIG. 9, variations in the hybrid traversal may occur at the boundary between a subset of related objects 302 and the selected objects 104 that are owned by the subset, but not included in the subset. That is, while the subset of related objects 302 is traversed in a drawing order 204 relative to one another (e.g., in a back-to-front manner, which is represented herein as a downward ordering among the subset of related objects 302), and the remaining objects 104 are traversed in an ownership order 108 (e.g., in an upward manner, such as a depth-first traversal among owned objects 104), the traversal order between such objects 104, i.e., at the interface between the ownership order 108 and the drawing order 204, may vary.

In a first example hybrid traversal 902, the subset of related objects 302 is rendered in drawing order 204 as a contiguous sequence. That is, when the first hybrid traversal 902 reaches one of the related objects 302 in the subset, all of the related objects 302 are rendered in a contiguous sequence according to the drawing order 204. Any objects 104 that are owned and/or encapsulated by the subset of related objects 302 (e.g., objects 9, 11, and 12 for the first subset of related objects 302) are rendered before the subset of related objects 302, e.g., in order to ensure that when the owning or encapsulating object 104 of the subset of related objects 302 is rendered, all of its encapsulated objects 104 have already been rendered and are ready and available for inclusion in the rendering of the subset of related objects 302. As an alternative hybrid traversal 304 (not shown), objects 104 that are owned and/or encapsulated by the subset of related objects 302 (e.g., objects 9, 11, and 12 for the first subset of related objects 302) may be rendered after the subset of related objects 302. This variation may be advantageous, e.g., for reducing unhelpful rendering of owned or encapsulated objects 104 where the owned or encapsulating object 104 is fully occluded by the rendering of other objects 104 of the object set 102.

In a second example hybrid traversal 904, a rendering of a subset of related objects 302 may be interleaved with the rendering of any objects 104 that are owned or encapsulated by the set of related objects 302, but that not members of the subset of related objects 302. For example, when the example hybrid traversal 904 reaches the third object 104, rendering may progress according to drawing order 204 among the second subset of related objects 302; but when the drawing-order-based hybrid traversal reaches the sixth object 104 in this subset, the example hybrid traversal 904 may first transition out of drawing order 204 for the subset and instead render the objects 104 that are contained by the sixth object 104 in ownership order 108 (e.g., objects 10, 13, and 14). As shown in the example second hybrid traversal 904, these objects 104 may be rendered in ownership order 108 before the sixth object, e.g., to ensure that their rendered representations are available when the example hybrid traversal 904 returns to the sixth object 104. Alternatively, as shown in the example third hybrid traversal 906, these objects 104 may be rendered in ownership order 108 after the sixth object, e.g., to avoid unnecessarily rendering such owned or contained objects 104 if the sixth object 104 happens to be fully occluded in the scene.

Put another way, a selected object 104 of the subset of related objects 302 may have an ownership relationship 106 with a second object 104 that is not within the subset of related objects 302, and performing the hybrid traversal 304 may involve traversing the selected object 104 within the object set 102 according to the ownership order 108 or according to the drawing order 204. Conversely, a selected object 104 that is not within the subset of related objects 302 may have an ownership relationship 106 with a second object 104 that is within the subset of related objects 302. Performing the hybrid traversal 304 may further involve traversing the selected object 104 within the object set 102 according to the ownership order 108, or according to the drawing order 204. That is, given a first object 104 that is within a subset of related objects 302 and a second object 104 with an ownership relationship 106 to the first object 104 but not within the subset of related objects 302, it may be convenient either to include the second object 104 in the drawing order 204 or to include the first object 104 in the ownership order 108.

A second variation of this third aspect involves the manner in which the ownership order 108 is performed in the hybrid traversal 902. As a first such example, the ownership order 108 may comprise a depth-first traversal, e.g., all owned or encapsulated objects 104 may be traversed and rendered before rendering the owning or encapsulating object. Alternatively, the ownership order 108 may comprise a breadth-first traversal, e.g., all owned or encapsulated objects 104 may be traversed and rendered after rendering the owning or encapsulating object. In some variations, an object 104 may have two owning or encapsulating objects 104 (e.g., an object set 102 structured as an object graph that permits multiple ownership and/or cycles), and the hybrid traversal 902 may include the object 104 with the first owning or encapsulating object 104 or the second owning or encapsulating object 104, but not both. Various techniques may be applied to ensure that such object sets 102 are properly rendered, including refraining from rendering the same object 104 multiple times for a single rendering, e.g., keeping a record of already-rendered objects 104, and/or merely identifying the traversal order 906 during the hybrid traversal 304 and performing rendering as a second, discrete step.

A third variation of this third aspect involves the manner in which the drawing order 204 is identified for a subset of related objects 302. As a first example, respective objects 104 of the object set 102 may comprise a distance when viewed from a perspective within the scene (e.g., a visual distance between the object 104 and a location of the user within a virtual environment, or a z-ordering among a set of overlapping two-dimensional representations in a graphical computing environment). Identifying the drawing order 204 may therefore involve sorting the related objects 302 in descending distance order, such that the furthest objects 104 are rendered first followed by incrementally closer objects 104.

As a first example of this third variation, the drawing order 204 of the object set 102 may static (e.g., for a static user interface or a static content set), and the drawing order 204 of the related objects 320 may be stored before the request to present the scene and then retrieved and used for the hybrid traversal 304. In some scenarios, the storing may occur prior to receiving any request to render the scene, such as at design time; in other scenarios, the storing may occur at runtime after a first rendering, such as caching the drawing order 204 for use during later instances of rendering the object set 102. Alternatively, the determination of the drawing order 204 may occur at runtime in response to each request to present the scene (e.g., per frame), and the hybrid traversal may be performed according to the drawing order 204 identified responsive to the request to present the scene. This variation may be advantageous for dynamic content, such as moving parts of a graphics object that may involve a different drawing order 204 for each rendered frame.

As a second example of this third variation, the drawing order 204 may support a variety of rendering features that are supported by and/or exposed by the hybrid traversal 304. As a first such example, an object set 102 may comprise a first object 104 further comprises an aperture, and a second object 104 that has a greater distance from the rendering perspective than the first object 104. Rendering the object set 102 to produce the scene according to the hybrid traversal 304 may further comprise displaying at least a portion of the second object 104 through the aperture of the first object 104. As a second such example, the use of the ownership order 108 for some portions of the rendering process and the drawing order 204 for other portions may facilitate effects in which a first object 104 that is closer to the perspective than the second object 104 may nevertheless have a rendering effect on the rendering of the second object 104, such as a drop shadow cast by the first object 104 on the second object 104 and/or a translucent portion of the first object 104 through which at least a portion of the second object 104 is visible. Typically, such rendering effects are achieved through complex graphics pipelines, such as raytracing, that may not be suitable for the rendering of some object sets 102, such as a two-dimensional presentation of application windows and user interfaces in a graphical computing environment. That is, applying a raytracing model to a set of windows may unnecessarily involve computationally robust but power-consuming graphics processing capabilities, such as the use of a graphics processing unit (GPU) that may reduce the battery life of a device such as a mobile phone. The hybrid traversal 304 of the object set 102 in accordance with the techniques presented herein may enable the realization of some rendering effects in the rendering of such object sets 102 in a manner that does not involve computationally intensive operations. Many such variations may be included in the hybrid traversal 304 of the object set 102 in accordance with the techniques presented herein.

E4. Hybrid Traversal vs. Ownership Traversal Variations

A fourth aspect that may vary among embodiments of the presented techniques involves the scenarios in which the hybrid traversal 304 and ownership traversal 110 are selected for use with the object set 102.

As a first variation of this fourth aspect, some requests to render the object set 102 may involve the hybrid traversal, while other requests to process the objects 104 of the object set 102 may request a traversal according to a depth-first order with respect to the ownership relationships 106, which may be fulfilled by traversing the object set 102 in a depth-first order with respect to the ownership relationships 106. For instance, in the example scenario 400 of FIG. 4, requests to perform a rendering 414 the object set 102 are fulfilled by a scene presenter 410 using a hybrid traversal 304, whereas requests to perform a processing 416 of the object set 102 may be fulfilled by the object set processor 412 using an ownership traversal 110. Alternatively, the requested traversal may comprise a breadth-first order with respect to the ownership relationships 106, which may be fulfilled by traversing the object set 102 in a breadth-first order with respect to the ownership relationships 106.

In some scenarios, the characterization of a request as within the domain of processing 416 or rendering 414 may be variable. For example, a request may be received to perform a hit test at a selected location within the scene, such as a translation of a coordinate of a click event with the user interface control that is visually located at the coordinate. The hit testing request may be fulfilled by applying the hybrid traversal 304 to the object set 102 to compare the coordinate with the bounding regions of the objects 104, including the depth-based layering of user interface controls according to the perspective of the user within the scene. Using the hybrid traversal 304 for this task may ensure that the outcome of the determination is consistent with a visual rendering of the object set 102 (e.g., the user interface control to which the click event is directed is the same user interface control that visually appears at the location of the click event, rather than incorrectly sending the click event to a user interface control that is visually obscured by another user interface control at the location). The use of the hybrid traversal 304 for the hit-testing may facilitate some scenarios, e.g., a first window having an aperture through which a button of a second, more distant window is visible, where using the hybrid traversal 304 enables a click at the location of the button to be sent to the second window rather than the first window.

As a second variation of this fourth aspect, some traversal requests to traverse the object set 102 may involve a third order that is different than the drawing order and the ownership order. For example, a different type of processing may involve a different traversal order than either a back-to-front drawing order or a depth- or breadth-first ownership order. Moreover, the third order may be applicable only to some objects of the object set 102. The hybrid traversal 304 may therefore involve traversing the at least two objects according to the third order rather than the drawing order and the ownership order. Many such variations may be included in variations of the techniques presented herein.

F. Computing Environment

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

Figure 10:
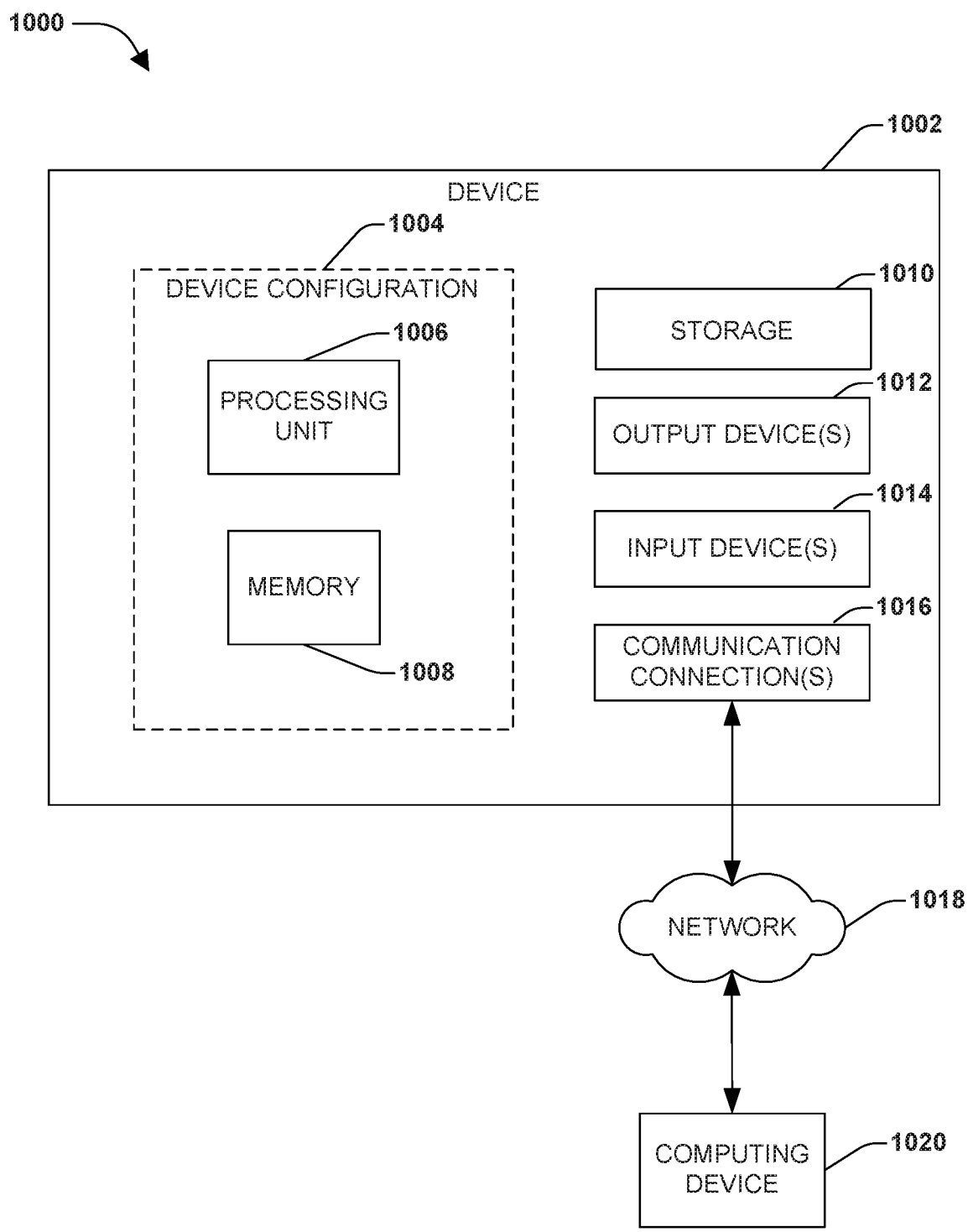
FIG. 10 illustrates an exemplary computing environment wherein one or more of the provisions set forth herein may be implemented.

FIG. 10 illustrates an example of a system comprising a computing device 1002 configured to implement one or more embodiments provided herein. In one configuration, computing device 1002 includes at least one processing unit 1006 and memory 1008. Depending on the exact configuration and type of computing device, memory 1008 may be volatile (such as RAM, for example), non-volatile (such as ROM, flash memory, etc., for example) or some combination of the two. This configuration is illustrated in FIG. 10 by dashed line 1004.

In other embodiments, device 1002 may include additional features and/or functionality. For example, device 1002 may also include additional storage (e.g., removable and/or non-removable) including, but not limited to, magnetic storage, optical storage, and the like. Such additional storage is illustrated in FIG. 10 by storage 1010. In one embodiment, computer readable instructions to implement one or more embodiments provided herein may be in storage 1010. Storage 1010 may also store other computer readable instructions to implement an operating system, an application program, and the like. Computer readable instructions may be loaded in memory 1008 for execution by processing unit 1006, for example.

The term "computer readable media" as used herein includes computer storage media. Computer storage media includes volatile and nonvolatile, removable and non-removable media implemented in any method or technology for storage of information such as computer readable instructions or other data. Memory 1008 and storage 1010 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1002. Any such computer storage media may be part of device 1002.

Device 1002 may also include communication connection(s) 1016 that allows device 1002 to communicate with other devices. Communication connection(s) 1016 may include, but is not limited to, a modem, a Network Interface Card (NIC), an integrated network interface, a radio frequency transmitter/receiver, an infrared port, a USB connection, or other interfaces for connecting computing device 1002 to other computing devices.

Communication connection(s) 1016 may include a wired connection or a wireless connection. Communication connection(s) 1016 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1002 may include input device(s) 1014 such as keyboard, mouse, pen, voice input device, touch input device, infrared cameras, video input devices, and/or any other input device. Output device(s) 1012 such as one or more displays, speakers, printers, and/or any other output device may also be included in device 1002. Input device(s) 1014 and output device(s) 1012 may be connected to device 1002 via a wired connection, wireless connection, or any combination thereof. In one embodiment, an input device or an output device from another computing device may be used as input device(s) 1014 or output device(s) 1012 for computing device 1002.

Components of computing device 1002 may be connected by various interconnects, such as a bus. Such interconnects may include a Peripheral Component Interconnect (PCI), such as PCI Express, a Universal Serial Bus (USB), Firewire (IEEE 1394), an optical bus structure, and the like. In another embodiment, components of computing device 1002 may be interconnected by a network. For example, memory 1008 may be comprised of multiple physical memory units located in different physical locations interconnected by a network.

Those skilled in the art will realize that storage devices utilized to store computer readable instructions may be distributed across a network.

For example, a computing device 1020 accessible via network 1018 may store computer readable instructions to implement one or more embodiments provided herein. Computing device 1002 may access computing device 1020 and download a part or all of the computer readable instructions for execution. Alternatively, computing device 1002 may download pieces of the computer readable instructions, as needed, or some instructions may be executed at computing device 1002 and some at computing device 1020.

G. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. One or more components may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Any aspect or design described herein as an "example" is not necessarily to be construed as advantageous over other aspects or designs. Rather, use of the word "example" is intended to present one possible aspect and/or implementation that may pertain to the techniques presented herein. Such examples are not necessary for such techniques or intended to be limiting. Various embodiments of such techniques may include such an example, alone or in combination with other features, and/or may vary and/or omit the illustrated example.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

As used in this application, the term "each," in the context of a plurality of items, is used to describe one or more of the items in the plurality in an individual manner. The term "each" is not intended to mean "each and every." In some instances, the comments about "each" item may accurately describe all of the items in the plurality; in other instances, one or more items in the plurality may not be accurately described by such comments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated example implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that presents scenes of objects, the device comprising:
 a processor; and
 a memory storing instructions that, when executed by the processor, cause the processor to instantiate at least:
  an object set of objects that are organized by an ownership order within a hierarchy reflecting ownership relationships among the objects, wherein under the ownership order, each owned object is traversed prior to an owner object that owns the corresponding owned object, at least one of the objects having a group identifier; and
  a scene presenter that:
   identifies a subset of related objects of the object set that share a same value of the group identifier prior to identifying a visual distance of an object contained in the set of objects;
   identifies a drawing order of the related objects of the subset,
    wherein the identifying the drawing order comprises, for each related object contained in the subset, identifying a visual distance of the corresponding related object from a particular perspective, and
    wherein under the drawing order, the related objects are traversed in an order based on each identified visual distance of the corresponding related object from the particular perspective;

performs a hybrid traversal of the object set according to the drawing order for the subset of the related objects and the ownership order for a remainder of the object set;

renders the objects into the scene according to the hybrid traversal; and presents the scene generated by the rendering.

2. The device of claim 1, wherein:

the object set further comprises metadata that identifies the subset of related objects of the object set; and identifying the subset of related objects further comprises: identifying the objects within the subset according to the metadata of the object set.

3. The device of claim 2, wherein:

the metadata further comprises a field of at least the related objects of the subset, wherein the related objects of the subset comprise a value for the field that identifies the subset; and identifying the subset of related objects further comprises: identifying the objects within the subset that share the value of the field that identifies the subset.

4. The device of claim 3, wherein:

respective objects of the subset further comprise a collection of contiguous objects within the object set, wherein a first object and a second object that share an ownership relationship are contiguous; and identifying the subset of related objects further comprises: identifying the objects within the subset that comprise a subset of contiguous objects that share the value of the field that identifies the subset.

5. The device of claim 2, wherein:

the metadata further comprises a container of the object set that identifies the related objects of the subset; and identifying the subset of related objects further comprises: identifying the objects within the subset that are within the container.

6. The device of claim 2, wherein:

the metadata further comprises:

a subset start indicator associated with a first object of the object set, and a subset end indicator associated with a second object of the object set; and identifying the subset of related objects further comprises: identifying the objects of the object set that are between the first object comprising the subset start indicator and the second object comprising the subset end indicator.

7. The device of claim 1, wherein:

the object set further comprises a delegate function that identifies the objects comprising the subset of related objects within the object set; and identifying the subset of related objects further comprises: invoking the delegate function to identify the objects comprising the subset of related objects within the object set.

8. The device of claim 1, wherein identifying the subset of related objects further comprises:

initiating a request for the subset to claim the objects comprising the subset; and responsive to the request, receiving a claim that at least one object is within the subset of related objects.

9. A method of presenting a scene of an object set of objects that are organized by an ownership order within a hierarchy reflecting ownership relationships among the objects, wherein under the ownership order, each owned object is traversed prior to an owner object that owns the corresponding owned object, at least one of the objects having a group identifier, the method involving a device having a processor and comprising:

executing, by the processor, instructions that cause the device to:

identify a subset of related objects of the object set that share a same value of the group identifier prior to identifying a visual distance of an object contained in the set of objects;

identify a drawing order of the related objects of the subset, wherein the identifying the drawing order comprises, for each related object contained in the subset, identifying a visual distance of the corresponding related object from a particular perspective, and wherein under the drawing order, the related objects are traversed in an order based on each identified visual distance of the corresponding related object from the particular perspective;

perform a hybrid traversal of the object set according to the drawing order for the subset of the related objects and the ownership order for a remainder of the object set;

render the objects into the scene according to the hybrid traversal; and present the scene generated by the rendering.

10. The method of claim 9, wherein:

respective objects of the object set further comprise a distance from a perspective within the scene; and identifying the drawing order of the related objects further comprises: sorting the related objects in descending distance order.

11. The method of claim 10, wherein the object set further comprises:

a first object further comprises an aperture, and a second object that has a greater distance from the perspective than the first object; and rendering the objects into the scene according to the hybrid traversal further comprises: displaying at least a portion of the second object through the aperture of the first object.

12. The method of claim 9, wherein:

a selected object of the subset of related objects has an ownership relationship with a second object that is not within the subset of related objects; and performing the hybrid traversal further comprises: traversing the selected object within the object set according to at least one of: the ownership order, and the drawing order.

13. The method of claim 9, wherein:

a selected object that is not within the subset of related objects has an ownership relationship with a second object that is within the subset of related objects; and performing the hybrid traversal further comprises: traversing the selected object within the object set according to at least one of: the ownership order, and the drawing order.

14. The method of claim 9, wherein:

identifying the drawing order of the related objects of the subset further comprises: storing the drawing order of the related objects before the request to present the scene; and performing the hybrid traversal according to the drawing order for the subset of the related objects further comprises: retrieving the drawing order that was stored for the subset of related objects.

15. The method of claim 9, wherein:
identifying the drawing order of the related objects of the subset further comprises: responsive to a request to present the scene, identifying the drawing order of the related objects; and
performing the hybrid traversal according to the drawing order for the subset of the related objects further comprises: performing the hybrid traversal according to the drawing order identified responsive to the request to present the scene.

16. A method of representing an object set of objects that are organized by an ownership order within a hierarchy reflecting ownership relationships among the objects, wherein under the ownership order, each owned object is traversed prior to an owner object that owns the corresponding owned object, at least one of the objects having a group identifier, the method involving a device having a processor and comprising:
executing, by the processor, instructions that cause the device to:
responsive to a request to display a scene of the objects:
identify a subset of related objects of the object set that share a same value of the group identifier prior to identifying a visual distance of an object contained in the set of objects;
identify a drawing order of the related objects of the subset,
wherein the identifying the drawing order comprises, for each related object contained in the subset, identifying a visual distance of the corresponding related object from a particular perspective, and
wherein under the drawing order, the related objects are traversed in an order based on each identified visual distance of the corresponding related object from the particular perspective;
perform a hybrid traversal of the object set according to the drawing order for the subset of the related objects and the ownership order for a remainder of the object set; and
present a rendering of the objects according to the hybrid traversal; and
responsive to a request to process the objects of the object set:
perform an ownership traversal of the object set only according to the ownership order; and
process the objects of the object set according to the ownership traversal.

17. The method of claim 16, wherein the request to display the scene of the objects further comprises: a request to perform a hit test at a selected location within the scene.

18. The method of claim 16, wherein:
the request to process the objects of the object set further comprises a request to process the objects in a depth-first order with respect to the ownership relationships; and
performing the ownership traversal further comprises: traversing the object set in a depth-first order with respect to the ownership relationships.

19. The method of claim 16, wherein:
the request to process the objects of the object set further comprises a request to process the objects in a breadth-first order with respect to the ownership relationships; and
performing the ownership traversal further comprises: traversing the object set in a breadth-first order with respect to the ownership relationships.

20. The method of claim 16, wherein:
at least two objects of the object set are associated with a third order that is different than the drawing order and the ownership order; and
performing the hybrid traversal further comprises: traversing the at least two objects according to the third order.

* * * * *